United States Patent
Aaron et al.

(10) Patent No.: US 8,112,805 B2
(45) Date of Patent: *Feb. 7, 2012

(54) METHODS AND SYSTEMS THAT SELECTIVELY RESURRECT BLOCKED COMMUNICATIONS BETWEEN DEVICES

(75) Inventors: Jeffrey A. Aaron, Atlanta, GA (US); Jun-Gang Alin, Duluth, GA (US)

(73) Assignee: Worcester Technologies LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/791,695

(22) Filed: Jun. 1, 2010

(65) Prior Publication Data
US 2010/0257606 A1   Oct. 7, 2010

Related U.S. Application Data

(63) Continuation of application No. 12/243,661, filed on Oct. 1, 2008, now Pat. No. 7,757,286, which is a continuation of application No. 11/007,553, filed on Dec. 8, 2004, now Pat. No. 7,434,262.

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |

(52) U.S. Cl. .......................................... 726/23; 709/206
(58) Field of Classification Search .......................... None
See application file for complete search history.

(56) References Cited

U.S. PATENT DOCUMENTS

| | | | |
|---|---|---|---|
| 4,899,333 | A | 2/1990 | Roediger |
| 4,922,486 | A | 5/1990 | Lidinsky et al. |
| 5,355,403 | A | 10/1994 | Richardson, Jr. et al. |
| 5,359,320 | A | 10/1994 | Jaffe et al. |
| 5,455,826 | A | 10/1995 | Özveren et al. |
| 5,553,145 | A | 9/1996 | Micali |
| 5,633,861 | A | 5/1997 | Hanson et al. |
| 5,675,733 | A | 10/1997 | Williams |
| 5,748,937 | A | 5/1998 | Abramson et al. |
| 5,812,525 | A | 9/1998 | Teraslinna |
| 5,850,520 | A | 12/1998 | Griebenow et al. |
| 5,978,836 | A | 11/1999 | Ouchi |
| 6,006,264 | A | 12/1999 | Colby et al. |
| 6,097,722 | A | 8/2000 | Graham et al. |
| 6,240,427 | B1 | 5/2001 | Szalwinski et al. |
| 6,314,454 | B1 | 11/2001 | Wang et al. |
| 6,332,164 | B1 | 12/2001 | Jain |
| 6,343,313 | B1 | 1/2002 | Salesky et al. |
| 6,438,215 | B1 | 8/2002 | Skladman et al. |
| 6,584,564 | B2 | 6/2003 | Olkin et al. |
| 6,609,138 | B1 * | 8/2003 | Merriam ................................ 1/1 |
| 6,609,184 | B2 | 8/2003 | Bradshaw et al. |
| 6,618,747 | B1 * | 9/2003 | Flynn et al. .................... 709/206 |
| 7,017,187 | B1 | 3/2006 | Marshall et al. |

(Continued)

*Primary Examiner* — Kambiz Zand
*Assistant Examiner* — Dant Shaifer Harriman
(74) *Attorney, Agent, or Firm* — Turocy & Watson, LLP

(57) ABSTRACT

Data communications between devices are selectively blocked and resurrected based on error notifications. Data communications from one or more source devices to one or more intended destination devices are selectively blocked based on content of the data communications. The blocked data communications are stored in a database. A blocked data communication is retrieved from the database in response to an error notification from one of the source devices and/or from one of the destination devices. The retrieved data communication is then sent to the intended destination device.

19 Claims, 2 Drawing Sheets

U.S. PATENT DOCUMENTS 7,240,199 B2 * 7/2007 Tomkow ................ 713/168
7,434,262 B2 * 10/2008 Aaron et al. ............. 726/23
7,676,699 B2 * 3/2010 Deily et al. ............. 714/39
7,757,286 B2 * 7/2010 Aaron et al. ............. 726/23

* cited by examiner

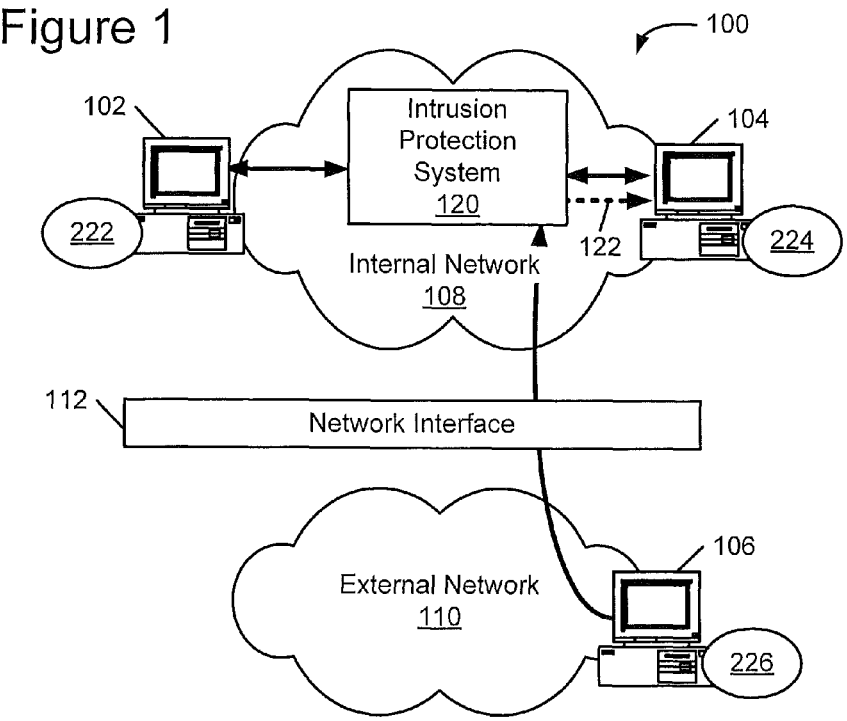
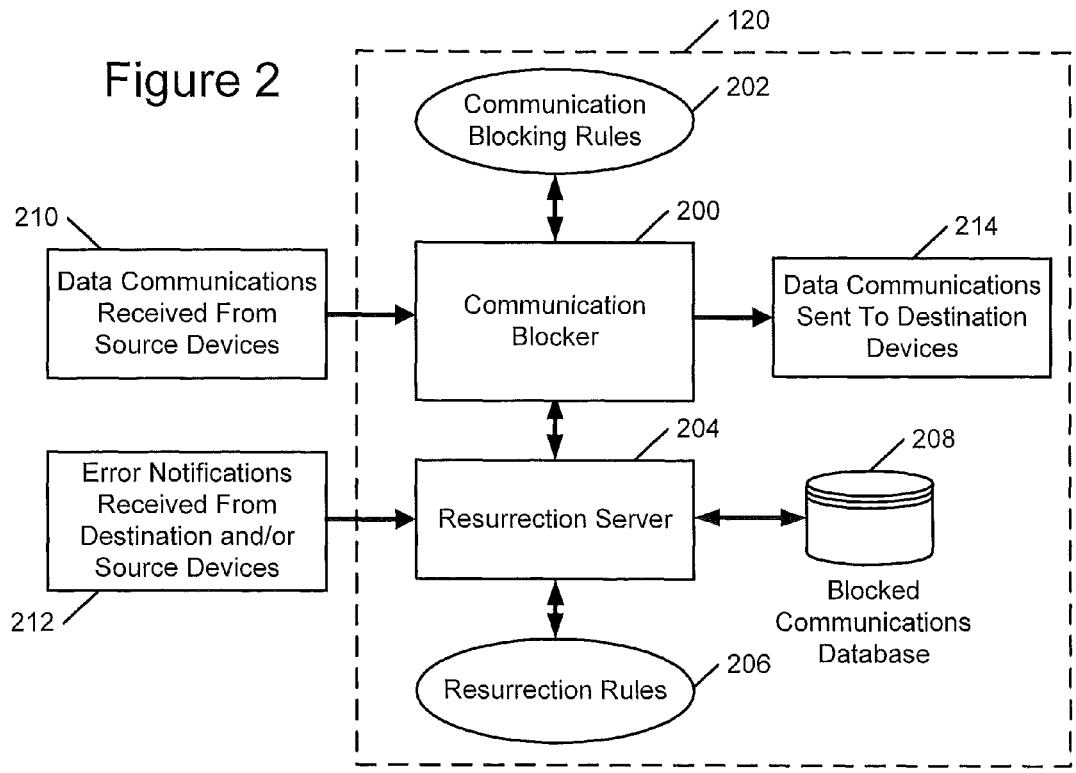

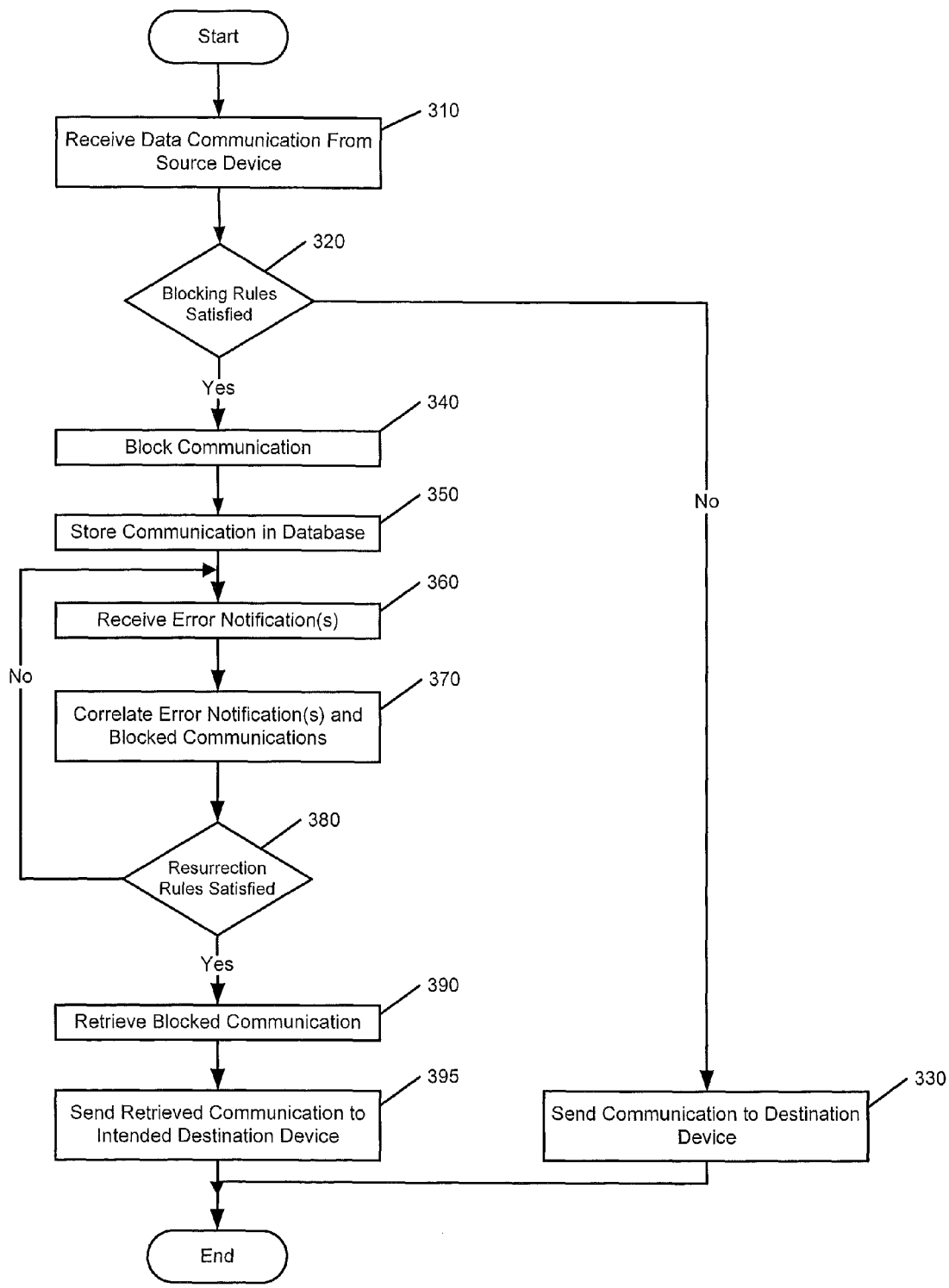

METHODS AND SYSTEMS THAT SELECTIVELY RESURRECT BLOCKED COMMUNICATIONS BETWEEN DEVICES

CROSS REFERENCE TO RELATED APPLICATIONS

This application is a continuation of U.S. application Ser. No. 12/243,661, filed Oct. 1, 2008 now U.S. Pat. No. 7,757, 286, which itself is a continuation of U.S. application Ser. No. 11/007,553, filed Dec. 8, 2004, now U.S. Pat. No. 7,434,262, the disclosures of both of which are hereby incorporated herein by reference in their entirety as if set forth fully herein.

FIELD OF THE INVENTION

This invention relates to networked computer systems, and more particularly to systems, methods and computer program products for blocking communications between devices.

BACKGROUND OF THE INVENTION

In the computer security field, "intrusion" is a broad term encompassing many undesirable activities. The objective of an intrusion may be to acquire information that a person is not authorized to have (referred to as "information theft"), it may be to cause business harm by rendering a network, system, or application unusable (referred to as "denial of service") and/or, it may be to gain unauthorized use of a system as a stepping stone for further intrusions elsewhere. Intrusions can follow a pattern of information gathering, attempted access, and then destructive attacks.

Some intrusions can be detected and neutralized by the target system, although often not in real time. Other intrusions may not be effectively neutralized by the target system. Intrusions can also make use of "spoofed" packets which are not easily traceable to their true origin. Many intrusions now make use of unwitting accomplices—that is, machines or networks that are used without authorization to hide the identity of the intruder. For these reasons, detecting attempts at information gathering, access attempts, and intrusion accomplice behaviors can be an important part of intrusion detection.

Intrusions can be initiated against a host on an internal network by, for example, an intruder that is on an external network (e.g., internet) or from an intruder that is on the internal network. A firewall may provide some protection against intrusions from external networks. However, it may not prevent intrusions once the firewall has "approved" entry into the internal network, and it may not provide protection when the intrusion is initiated from inside the internal network.

An Intrusion Protection System (hereinafter, "IPS") can provide protection from many types of intrusions, An IPS may include intrusion detectors that examine network traffic. Intrusion detectors may be placed at strategic points in networks, such in a firewall between an external network and an internal network, and/or on the internal network. Intrusion detectors may use "pattern matching" to try to match data communications on the network(s) against a known intrusion signature, or other rules that define when a data communication is to be deemed an intrusion.

Upon detecting an intrusion, the IPS may block a data communication from reaching an intended destination device. The IPS may also block subsequent data communications from the device that was the source of the communication identified.

Defining rules under which an IPS identifies and blocks communications can be a challenging trade-off. Rules with high levels/low thresholds for detecting intrusions may be more likely to block intrusions, but may also be more likely to block valid communications. In contrast, rules with low detection levels/high thresholds may avoid blocking valid communications, but may also increase the number of intrusions that are not blocked.

Some valid communications may be blocked without substantially harming the destination device or a user thereof, such as blocking some email messages. However, blocking other valid communications may cause the source and/or destination device to malfunction. For example, blocking data packets in a bi-directional video conference or an interactive game may cause the associated applications on the communication devices to malfunction. Accordingly, an IPS that blocks valid data communications and/or allows intrusion can negatively affect the operation of the associated communication devices.

SUMMARY OF THE INVENTION

Exemplary embodiments of the present invention provide methods of controlling data communications between devices. Data communications from one or more source devices to one or more intended destination devices are selectively blocked based on content of the data communications. The blocked data communications are stored in a database. A blocked data communication is retrieved from the database in response to an error notification from one of the source devices and/or from one of the destination devices. The retrieved data communication is then sent to the intended destination device.

In some further embodiments of the present invention, the data communications are evaluated based on communication blocking rules, and a selected data communication is selectively prevented from reaching one or more of the destination devices when one or more of the communication blocking rules is satisfied. The communication blocking rules may be modified based on one or more of the error notifications. The communication blocking rules may be modified to allow data communications to occur between a source device and a destination device that were previously blocked.

An error condition may be detected which is associated with one of the destination devices and caused by a missing data communication from one of the source devices. An error condition may also be detected which is associated with one of the source devices and caused by a missing acknowledgement communication and/or the reception of an other communication which directly and/or indirectly confirms receipt of the data communication by the destination device. The error notification may then be generated from the source device and/or the destination device based on one or more detected error conditions.

The error notification may contain information that identifies the source device of the blocked communication, the intended destination device of the blocked data communication, and/or when the missing data communication was expected to be received. The blocked data communications may be stored in a database with information that indicates the source device of the blocked data communication, the intended destination device of the blocked data communication, and/or when the data communication was blocked. Accordingly, a blocked data communication may be retrieved from the database based on correlation of the error notification information and the information that is stored with the blocked data communication.

In some further embodiments of the present invention, a blocked data communication that is in the database may be identified based on an indication in the error notification of when the missing data communication was expected to be received and based on an indication in the stored information of when the data communication was blocked. Alternatively, or additionally, a blocked data communication may be retrieved from the database when error notifications are received from a source device and a destination device, and are determined to each correspond to a same identified one of the blocked data communications.

Some other embodiments of the present invention provide an intrusion protection system that includes a communication blocker, a database, and a resurrection server. The communication blocker is configured to selectively block data communications from one or more source devices to one or more intended destination devices based on content of the data communications. The database is configured to store blocked data communications. The resurrection server is configured to retrieve a blocked data communication from the database in response to an error notification received directly and/or indirectly from one of the source devices and/or from one of the destination devices, and to send the retrieved data communication to the intended destination device.

In some further embodiments of the present invention, the system further includes resurrection clients that are configured to identify an error condition associated with an application that is hosted by the source device and/or intended destination device, and to send the error notification to the resurrection server based on the detected error condition. The resurrection server may be configured to identify one or more of the blocked data communications in the database as associated with the error notification from one of the source devices and/or from one of the destination devices.

Moreover, computer program products also may be provided that can provide functionality associated with any of these methods and/or systems, according to various embodiments of the present invention. Other methods and/or computer program products according to other embodiments of the invention will be or become apparent to one of skill in the art upon review of the following drawings and Detailed Description. It is intended that all such additional methods and/or computer program products be included within this description, be within the scope of the present invention, and be protected by the accompanying claims.

BRIEF DESCRIPTION OF THE DRAWINGS

FIG. 1 is a block diagram of systems, methods and/or computer program products for controlling data communications between devices according to various embodiments of the present invention.

FIG. 2 is a block diagram of an intrusion protection system and related methods and/or computer program products for controlling data communications between devices according to various embodiments of the present invention.

FIG. 3 is a flowchart of operations that may be performed according to various embodiments of the present invention.

DETAILED DESCRIPTION

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.) that is executed by hardware. Furthermore, the present invention may take the form of a computer program product on a computer-usable or computer-readable storage medium having computer-usable or computer-readable program code embodied in the medium for use by or in connection with instruction execution system hardware.

The computer-usable or computer-readable medium may be, for example but not limited to, a portable computer diskette, a random access memory (RAM), a read-only memory (ROM), an erasable programmable read-only memory (EPROM or Flash memory), and a portable compact disc read-only memory (CD-ROM).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a block diagram of methods, systems and/or computer program products for controlling data communications between devices according to various embodiments of the present invention. Referring to FIG. 1, an exemplary networked computer system 100 includes a plurality of communication devices 102, 104, 106 and one or more data networks 108, 110. The network 108 may be an internal network that interconnects the communication devices 102,104. The network 110 may be an external network, such as the Internet, that interconnects communication devices, such as device 106, to the internal network 108. The internal network 108 may include one or more local area networks (LANs) and/or wide area networks (WANs), and/or it may include one or more wireless networks, such as a wireless LAN (WLAN) and/or cellular data network. The computer system 100 may also include a network interface 112 that interconnects the external network 110 and the internal network 108. The network interface 112 may include a firewall that is configured to selectively block data communications from the external network 110 that are intended for a communication device on the internal network 108.

The internal network 108 includes an intrusion protection system 120 that is configured to selectively block data communications that are sent from one or more source devices to one or more intended destination devices. When a data communication is blocked, it is prevented from reaching the intended destination device. The intrusion protection system 120 can selectively block, or allow, data communications based on their content. Such selective blocking is illustrated in the exemplary embodiment of FIG. 1, where the intrusion protection system 120 allows data communication between devices 102 and 104, and it blocks a data communication from the device 106 from reaching the device 104 (e.g., blocked communication flow indicated by the dashed line 122).

The intrusion protection system 120 can store blocked data communications in a database. It can then retrieve one or more blocked data communications from the database in response to an error notification message from one or more of the devices that sent the blocked data communication and/or from one or more of the devices that were the intended destination of the block communication. The intrusion protection system 120 can then send the retrieved data communication to the intended destination device.

FIG. 2 is a block diagram of the intrusion protection system 120 and associated methods and/or computer program products according to various embodiments of the present invention, As shown in FIG. 2, the intrusion protection system 120 may include a communication blocker 200, a blocking rules repository 202, a resurrection server 204, a resurrection rules repository 206, and a blocked communications database 208.

The intrusion protection system 120 can receive data communications, via block 210, from source devices (e.g., devices 102,104) on the networks 108,110. In response to a received data communication, the communication blocker 200 determines whether to block the communication based on the communication blocking rules 202. For example, the communication blocker 200 may evaluate the content of received communications (e.g., pattern detection, source address, destination address) based on the blocking rules 202, and may block a received communication when one or more of the block rules 202 are satisfied. Communications that are not blocked can be communicated through block 214 to an intended destination device, Blocked communications can be stored in the blocked communications database 208 through the resurrection server 204. The database 208 may be local to the intrusion protection system 120 and/or it may be accessible by, for example, the network 108.

The resurrection server 204 and/or the database 208 can generate an identifier for each blocked communication in the database 208, which may be used to track and later retrieve the stored communications. The identifier can be generated based on information associated with the blocked communication, including, but not limited to, the date and/or time that the communication was received and/or blocked by the system 120, the address of the device that sourced the communication, the address of the intended destination device, network port, protocol (e.g., which may indicate or imply still-image data, voice data, video data, user input data, print data), and/or other information associated with a blocked communication (e.g., information which may be in a header portion and/or even in the data payload portion of the communication).

For example, the identifier may be generated by concatenating two or more of the information items associated with the communication to form a string, which may be hashed to generate a unique fixed-length hash result. The string may be recorded and used by the resurrection server 204 to correlate error notifications from destination devices and/or source devices with blocked communications that are stored in the database 208, as will be further discussed below. The hash result may be used by the resurrection server 204 to look-up and retrieve selected blocked communications from the database 208, wherein each blocked communication may be indexed by the hashes of its associated string.

The resurrection server 204 selectively retrieves blocked communications from the database 208 based on error notifications that it receives, via block 212, from source devices and/or destination devices associated with the block communications. The error notifications may be generated by resurrection clients that are distributed among the source and destination devices. For example, as illustrated in FIG. 1, the communication devices 102, 104, and 106, include resurrection clients 222, 224, and 226, respectively, as software that is hosted thereon. The resurrection clients monitor applications that are hosted by the communication devices for errors that may be caused by one or more data communications that were blocked by the intrusion protection system 120.

For example, as was described with regard to FIG. 1, the data communication 122 from device 106 is blocked by the instruction protection system 120 from reaching device 104. One or more applications on the device 104 may develop an error condition because data has not been received because of the blocked communication 122. The resurrection client 224 may detect the error condition based on rules that are associated with the operation of applications on the device 104. The rules may include monitoring timers associating with a maximum or untypical wait times for applications that are waiting for data from another device, such as device 106. The rules may also define under what conditions the resurrection clients are to generate an error notification to the intrusion protection system 120 (e.g., after a threshold number of retransmission requests have been made by the receiving device).

Upon detecting an error condition, the resurrection client 224 can generate an error notification to the intrusion protection system 120. The error notification may identify the device that is associated with the error condition (e.g., device 104), the missing communication, when the communication was expected to have been received (e.g., date and/or time), characteristics of the application error condition (e.g., input wait timer expiration, unresponsive application, error type, error code), and/or the source device from which the communication was expected to have been received (e.g., device 106).

The resurrection client (e.g., client 226) hosted by the source device (e.g., device 106) may also generate an error notification to the intrusion protection system 120 when, for example, an acknowledgement message is not received within a defined time from the destination device (e.g., device 104) that acknowledges receipt of a sent communication, when the destination device sends an indication that the sent communication was not received (e.g., a retransmission request), when a subsequently received message from the destination device (e.g., device 104) indirectly implies by its unexpected presence and/or by being out-of-sequence or out-of-order that the communication was blocked, and/or when a threshold number of retransmission attempts have been made with unsuccessful receipt thereof.

The error notifications may be encrypted by the resurrection clients associated with the source and/or destination devices before they are sent across the networks 108,110 to the intrusion protection system 120. The intrusion protection system 120 can then be configured to decrypt and in some cases authenticate the error notifications.

With reference to FIGS. 1-2, the intrusion protection system 120 may correlate the error notifications that are received from source devices and/or destination devices with each other, and with the blocked communications that are stored in the database 208. For example, the resurrection server 204 may determine that error notifications that were received from the devices 104 and 106 are related to the same missing communication, and it may determine that the missing communication is stored as a blocked communication in the database 208. The intrusion protection system 120 may then retrieve the blocked communication from the database 208 and send it via block 214 to the destination device 104.

The resurrection server 204 may correlate the error notifications with each other and the blocked communications in the database 208 based on the resurrection rules 206, and based on information that is associated with the error notifications and information stored with the blocked communications. The information that may be used for such correlation can include, but is not limited to, the date and/or time that the communication was received and/or blocked by the system 120, the date and/or time that a communication was expected to be received by a device, the address of the device that sent the communication, the address of the intended destination device, characteristics of a detected application error condition, network port, protocol, and/or other information associated with a blocked communication (e.g., information which may be in a header portion and/or in the data payload portion of the communication). The date and/or time information that is associated with the error notifications may be compensated for network and processing delays.

Other information that may be used for such correlation can include if previously blocking of certain messages has resulted in receipt of error notifications, and/or how many error notifications have been received during a threshold amount of time. For example, a high number of error notifications per unit time may indicate the communications are related to an attempted hacking of a device.

The resurrection server 204 may also filter the error notifications and/or the results of the correlations based on thresholds that are defined by the resurrection rules 206. For example, correlations that exceed a threshold level (i.e., a high level of confidence) may cause the resurrection server 204 to immediately send the blocked communication. Other correlations that fall between a range of threshold levels (i.e., a medium level of confidence) may cause the resurrection server 204 to wait for receipt of further associated error notifications before sending the blocked communication. Yet other correlations that are below another threshold level (i.e., a low level of confidence) may not cause the resurrection server 204 to send the blocked communication. The filtering may additionally, or alternatively, be based on receiving repetitive notifications from source/destination devices over a defined elapsed time.

The resurrection server 204 may decide, based on the resurrection rules 206, to not send a blocked communication to the destination device when the blocked communication is determined to be sufficiently old such that it should not be sent from the database 208, and/or that it should now be newly retrieved from the source device. Such time sensitive communications can include, for example, video and/or voice communications. The resurrection server 204 may then send a retransmission and/or re-initiation request to the source device and allow the resent and/or re-started communication to pass through to the destination device.

The resurrection server 204 may also cause the communication blocking rules 202 to be modified so that the communication blocker 200 may, for example, allow communications to pass through which would previously have been blocked. The communication blocking rules 202 may initially be set to a high level of protection so that all, or nearly all, invalid (intrusion) communications are blocked by the communication blocker 200. The high level of protection may also result in a high probability that valid communications will be blocked and stored in the database 208. The blocking rules 202 may then be adjusted by the resurrection server 204 based on error notifications and the resurrection rules 206 so that the intrusion protection system 120 adapts to reduce or avoid blocked valid communications by optimizing the level of protection for the best balance/compromise between desired blocked intrusions and undesired blocked valid communications.

The blocking rules 202 may be adapted when a threshold amount of correlation is determined between the error notifications, blocked communications, and associated information, such as was explained above. For example, a high level of correlation may cause the rules for communications between identified devices or by identified communications to be modified. A lower level of correlation may cause the blocking rules 202 to be modified in a more limited manner, and yet a lower level of correlation may cause blocked communications to be resurrected and sent while the blocking rules 202 are not changed. A higher level of correlation/certainty may also result in blocking rules being modified for a larger set of devices, whereas a lower level of correlation/certainty may restrict the blocking rules modification to just the devices from which associated error notifications have been received and/or which can be otherwise associated with the occurrence of blocking of valid communications. In some other embodiments, the blocking rules 202 may be modified by an operator in response to alarm notifications from the resurrection server 204.

The intrusion protection system 120 may not, in some circumstances, inform a source device that its communication has been blocked or that it has been later resurrected. By not communicating such status information to a source device, attempted hackers are not provided with information that could be useful in attempting to circumvent the protections provided by the intrusion protection system.

The resurrection server 204 may store information that allows monitoring of received error notifications and actions relating thereto, including what blocked communications were resurrected and sent. The monitoring can include tracking what resurrection clients sent error notifications and what application errors or other information was identified by the error notifications.

An alarm may be generated to an operator when error notifications continue to be received from a particular resurrection client after the blocking rules 202 have been modified in an attempt to avoid blocking communications that appeared to have been the cause of the earlier error notifications. An alarm may also be generated when error notifications identifying different application errors are received from the same resurrection client, which may indicate that resurrection of a blocked communication and/or modification of the blocking rules 202 has caused an unexpected problem that may need intervention by an operator. Yet other situations that may cause an alarm to be generated include: when the blocking rules 202 are modified; when they are modified at least a threshold amount (e.g., a threshold number or type of rules are modified); when they are modified for a large number of devices rather than just a communicating device pair or a small set of devices; when the modified rules relate to particular networks and/or communication devices (e.g., high security devices); when the number of error notifications from a resurrection client exceeds one or more thresholds in a defined amount of time; and/or when the number of error notifications that identify the same type of error from multiple resurrection clients exceeds one or more thresholds in a defined amount of time.

FIG. 3 is a flowchart of operations that may be performed to control data communications between devices according to various embodiments of the present invention. These operations may be performed, for example, by one or more of the blocks of FIGS. 1 and 2.

Referring to FIG. 3, at Block 310, a data communication is received from a source device. At Block 320, a determination is made as to whether blocking rules are satisfied based on information associated with the data communication. When the blocking rules are not satisfied, then at Block 330 the received communication is sent to the destination device.

In contrast, when the blocking rules are satisfied, then at Block 340 the received communication is blocked so that it is prevented from reaching the destination device. At Block 350, the blocked communication is stored in a database with other previously blocked communications. At Block 360, an error notification is received from the destination device and/or the source device. At Block 370, error notifications are correlated with each other and/or with the blocked communications in the database. At Block 380, a determination is made as to whether resurrection rules have been satisfied by the correlation. When the rules have been sufficiently satisfied, the blocked communication is retrieved from the database, and, at Block 395, it is sent to the originally intended destination device.

It will be understood that, in other embodiments of the invention, one or more of Blocks 310 to 395 may be performed, rather than all of Blocks 310 to 395 as shown in FIG. 3. In other embodiments of the invention, one, more than one, or all of Blocks 310 to 395 may be performed with any of the other embodiments described herein.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A Non-Transitory computer readable storage medium having embodied therein a computer program product for operating an intrusion protection system to control data communications between devices, comprising:

computer readable program code that is configured to conditionally block and store data communications flowing from at least one source device to at least one destination device in response to whether an attempted intrusion is detected in content of the respective data communications;

computer readable program code that is configured to detect an error operational condition in an application program that is associated with a defined one of the destination devices and caused by a data communication from one of the source devices being blocked from flowing to the defined destination device;

computer readable program code that is configured to retrieve the blocked data communication that was blocked and stored in response to receiving an error notification indicating that the error operational condition was detected in the application program associated with the defined destination device; and computer readable program code that is configured to send the data communication that was retrieved to the defined destination device.

2. The Non-Transitory computer readable storage medium of claim 1, wherein the computer readable program code that is configured to conditionally block and store data communications flowing comprises:

computer readable program code that is configured to evaluate content of the data communications based on communication blocking rules to detect an attempted intrusion into at least one of the destination devices; and computer readable program code that is configured to conditionally prevent a selected data communication from reaching at least one of the destination devices when at least one of the communication blocking rules are satisfied by the evaluation of content of the selected data communication.

3. The Non-Transitory computer readable storage medium of claim 2, further comprising computer readable program code that is configured to modify the communication blocking rules based on the error notification that was received indicating that the selected data communication caused the error operational condition in the application program associated with the defined destination device.

4. The Non-Transitory computer readable storage medium of claim 3, wherein the computer readable program code that is configured to modify the communication blocking rules comprises: computer readable program code that is configured to modify the communication blocking rules to allow subsequent data communications from a source device to reach the defined destination device identified by the error notification.

5. The Non-Transitory computer readable storage medium of claim 1, wherein the error notification is generated from the defined destination device of the blocked data communication that was blocked and contains information that identifies when the data communication that was blocked was expected to be received by the defined destination device.

6. The Non-Transitory computer readable storage medium of claim 1, further comprising: computer readable program code that is configured to detect an error operational condition in an application program that is associated with the source device of the blocked data communication that was blocked and that is caused by the defined destination device not receiving the data communication that was blocked; and
computer readable program code that is configured to retrieve the data communication that was blocked in response to receiving an error notification indicating that the error operational condition was detected in the application program associated with the source device.

7. The Non-Transitory computer readable storage medium of claim 6, wherein: the computer readable program code that is configured to detect an error operational condition in an application program that is associated with the source device comprises computer readable program code that is configured to determine that an acknowledgement communication was not received from the defined destination device of the blocked data communication that was blocked which confirms receipt of the data communication that was blocked; and the error notification contains information that identifies the source device of the data communication that was blocked, the defined destination device of the data communication that was blocked, and when the acknowledgement communication that was not received was expected to have been received from the defined destination device of the data communication that was blocked.

8. The Non-Transitory computer readable storage medium of claim 1, wherein the computer readable program code that is configured to send the retrieved data communication to the defined destination device comprises:
computer readable program code that is configured to determine an elapsed time between when the data communication was blocked and when the error notification was received; and computer readable program code that is configured to selectively forward the data communication that was retrieved to the defined destination device when the elapsed time that was determined is less than a threshold time and not forward the retrieved data communication that was retrieved to the defined destination device when the elapsed time that was determined is greater than the threshold time.

9. A method of operating an intrusion protection system to control data communications between devices, the method comprising:
selecting between blocking data communications from flowing and allowing data communications to flow from at least one source device to at least one destination device in response to whether an attempted intrusion is detected in content of the respective data communications; and
storing and sending the data communication that was blocked to a defined one of the destination devices in response to receiving an error notification indicating that an error operational condition was detected in an application program that is associated with the defined one of the destination devices and caused by a data communication from one of the source devices being blocked from flowing to the defined destination device.

10. The method of claim 9, wherein selecting between blocking data communications from flowing and allowing data communications to flow comprises:
evaluating content of the data communications based on communication blocking rules to detect an attempted intrusion into at least one of the destination devices; and
selectively preventing a selected data communication from reaching at least one of the destination devices when at least one of the communication blocking rules are satisfied by the evaluation of content of the selected data communication.

11. The method of claim 10, further comprising modifying the communication blocking rules based on the error notification that was received indicating that the data communication that was blocked caused the error operational condition in the application program associated with the defined destination device.

12. The method of claim 11, wherein modifying the communication blocking rules comprises:
modifying the communication blocking rules to allow subsequent data communications from a source device to reach the defined destination device identified by the error notification.

13. The method of claim 9, wherein the error notification is generated from the defined destination device of the data communication that was blocked and contains information that identifies when the data communication that was blocked was expected to be received by the defined destination device.

14. The method of claim 9, further comprising:
generating an error notification from the source device of the data communication that was blocked further based on a detected error operational condition in an application program that is associated with the source device of the data communication that was blocked and that is caused by the defined destination device not receiving the data communication that was blocked.

15. The method of claim 14, wherein:
the error operational condition in an application program that is associated with the source device comprises an acknowledgement communication that was not received from the defined destination device of the data communication that was blocked which confirms receipt of the data communication that was blocked; and
the error notification generated from the source device of the data communication that was blocked contains information that identifies the source device of the data communication that was blocked, the defined destination device of the data communication that was blocked, and when the acknowledgement communication that was not received was expected to have been received from the defined destination device of the data communication that was blocked.

16. The method of claim 9, wherein storing and sending the data communication that was blocked to a defined one of the destination devices comprises:
determining an elapsed time between when the data communication was blocked and when the error notification was received; and
selectively forwarding the data communication that was blocked to the defined destination device when the elapsed time that was determined is less than a threshold time and not forwarding the data communication that was blocked to the defined destination device when the elapsed time that was determined is greater than the threshold time.

17. An intrusion protection system comprising:
a communication blocker that is configured to conditionally block and store data communications flowing from at least one source device to at least one destination device in response to whether an attempted intrusion is detected in content of the respective data communications; and a resurrection server that is configured to receive an error notification indicating that an error operational condition was detected in an application program associated with a defined one of the destination devices and caused by a data communication from one of the source devices being blocked from flowing to the defined destination device and to send the data communication that was blocked and stored to the defined destination device in response to receiving the error notification.

18. The system according to claim 17, further comprising a resurrection client that is configured to detect an error operational condition associated with an application that is hosted by the defined destination device and caused by the data communication from one of the source devices being blocked from flowing to the defined destination device, and to generate and send the error notification to the resurrection server based on the error operational condition that was detected.

19. The system according to claim 17, wherein the resurrection server is configured to store with the data communication that was blocked information that indicates the destination device of the data communication that was blocked and when the data communication was blocked, and configured to identify the data communication that was blocked in the memory in response to identifying a correspondence between when the information indicates that the data communication directed to the defined destination device was blocked and when the received error notification indicates that the data communication that was blocked was expected to be received by the defined destination device.

* * * * *